(12) United States Patent
Sumitani

(10) Patent No.: US 7,526,175 B2
(45) Date of Patent: Apr. 28, 2009

(54) FEEDTHROUGH OF SUBMARINE REPEATER AND SUBMARINE REPEATER

(75) Inventor: Makoto Sumitani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/845,883

(22) Filed: Aug. 28, 2007

(65) Prior Publication Data

US 2007/0292097 A1    Dec. 20, 2007

Related U.S. Application Data

(63) Continuation of application No. PCT/JP2005/004285, filed on Mar. 11, 2005.

(51) Int. Cl.
*G02B 6/00* (2006.01)
(52) U.S. Cl. .................. 385/138; 174/70 S
(58) Field of Classification Search .......... 385/138; 174/70 S
See application file for complete search history.

(56) References Cited

U.S. PATENT DOCUMENTS 2,938,067 A * 5/1960 Werner ............. 174/70 S
4,653,846 A * 3/1987 Yamazaki et al. ......... 385/138
5,024,503 A * 6/1991 Gunn et al. ............. 385/53
6,094,519 A * 7/2000 Takeda ................ 385/138

FOREIGN PATENT DOCUMENTS

| JP | 57136608 A * | 8/1982 | ............. 385/102 |
| JP | 9-133817 | 5/1997 | |
| JP | 2002-118948 | 4/2002 | |
| JP | 2002-244001 | 8/2002 | |

OTHER PUBLICATIONS

International Search Report dated Jul. 5, 2005, from the corresponding International Application.

* cited by examiner

*Primary Examiner*—Sung H Pak
*Assistant Examiner*—Daniel Petkovsek
(74) *Attorney, Agent, or Firm*—Fujitsu Patent Center

(57) ABSTRACT

A disclosed feedthrough of a submarine repeater for introducing a tail cable connected to a submarine cable having a transmission line and a feed line into said submarine repeater includes: a tail cable introduction unit having an insulator for internally installing said transmission line and said feed line, said tail cable introduction unit introducing said tail cable connected to said submarine cable into said submarine repeater; a cap member for fixing said tail cable introduction unit on said submarine repeater; and a rubber film formed so as to cover a surface of said insulator.

7 Claims, 3 Drawing Sheets

FEEDTHROUGH OF SUBMARINE REPEATER AND SUBMARINE REPEATER

CROSS-REFERENCE TO RELATED APPLICATION

This application is a U.S. continuation application, filed under 35 USC 111(a) and claiming the benefit under 35 USC 120 and 365(c), of PCT application JP2005/004285 filed Mar. 11, 2005. The foregoing application is hereby incorporated herein by reference.

BACKGROUND OF THE INVENTION

1. Field of the Invention

The present invention relates to a feedthrough of a submarine repeater and a submarine repeater and more particularly to a feedthrough of a submarine repeater and a submarine repeater having a waterproof structure for preventing infiltration of seawater.

2. Description of the Related Art

Conventionally, submarine repeaters of submarine cables using optical fibers are laid with submarine cables in the deep sea thousands of meters below the surface, so that the submarine repeaters receive a high seawater pressure. Accordingly, such submarine repeaters are required to have high pressure resistance and high water tightness.

Further, as disclosed in Patent Document 1, for example, a position where the submarine cable is introduced into the submarine repeater is provided with a feedthrough (structure for connecting an optical fiber to a repeater unit in the submarine repeater). Specifically, a pressure-resistant housing lid is disposed on both sides of a pressure-resistant housing for storing the repeater unit and the feedthrough is inserted into a through-hole formed on the pressure-resistant housing lid. In this case, the feedthrough is installed on the pressure-resistant housing lid with high pressure resistance and high water tightness so as not to allow infiltration of seawater into the pressure-resistant housing.

FIG. 1 shows a feedthrough 100 as a conventional example. FIG. 1 shows the feedthrough 100 installed on a pressure-resistant housing lid 110 in an enlarged manner. In the figure, to the right of the pressure-resistant housing lid 110 is seawater and to the left is an inside of the housing. A tail cable 103 is constructed by successively coating a copper pipe 125 and an insulator 126 onto a circumference of an optical fiber 123 in a laminated manner. The tail cable 103 is integrally connected to a tail cable introduction unit 122 constituting the feedthrough 100.

The cable introduction unit 122 has a cap member 131 installed on a circumferential portion thereof. The cap member 131 includes first and second members 132 and 133 made of metal.

The first member 132 is fixed on the insulator 126 positioned at an outermost circumference of the cable introduction unit 122 in an inner side of the housing relative to the cable introduction unit 122 (left side of the figure). Further, the second member 133 is fixed on the cable introduction unit 122 by being screwed up on the first member 132. Moreover, the cable introduction unit 122 on which the cap member 131 is installed is fixed on the pressure-resistant housing lid 110 using a nut 134.

A boundary surface 143 where the first and second members 132 and 133 are brought into contact through screwing is a surface also in contact with the insulator 126 made of resin. In this manner, the boundary surface 143 is an extremely important portion in which the first and second members 132 and 133 made of metal and the insulator 126 are brought into contact and seawater pressure is applied, so that voltage resistance, water pressure resistance, and airtightness are required in particular at the same time. Thus, high reliability is required.

In view of this, conventionally, a rubber cap 141 is disposed between the cap member 131 and the tail cable 103 and polybutene 140 (insulating oil) is filled in a clearance formed by the rubber cap 141, cap member 131, and the tail cable introduction unit 122. Accordingly, a polybutene injection portion 142 for filling the polybutene 140 is disposed on the second member 133 and the polybutene injection portion 142 is closed using a screw after the polybutene 140 is filled.

In this structure, compression of the polybutene 140 from seawater pressure and volume change from heat are absorbed through elastic deformation of the rubber cap 141. Further, the rubber cap 141 and the tail cable 103 are strapped with a tape 165 such that seawater is not filtrated between the rubber cap 141 and the tail cable 103.

Patent Document 1: Japanese Laid-Open Patent Application No. 2002-118948

However, in the conventional feedthrough 100, the rubber cap 141 must be disposed between the second member 133 and the tail cable 103 in a liquid-tight manner so as to absorb the compression of the polybutene 140 from seawater pressure and the volume change from heat. Further, the cap member 131 requires the polybutene injection portion 142 for filling the polybutene 140 and the screw for closing the polybutene injection portion 142 with a high airtightness. Thus, the structure of the feedthrough 100 is complicated, so that a number of components is increased and assembly is troublesome.

Further, upon filling the polybutene 140, it is necessary to perform the filling without allowing air bubbles to get into the polybutene 140. Thus, in a conventional process, the portion to fulfill the polybutene 140 is subjected to vacuuming via the polybutene injection portion 142, and then the polybutene 140 is injected. Accordingly, the process for filling the polybutene 140 is very troublesome.

Moreover, when the submarine repeater on which the feedthrough 100 is installed is subjected to an airtightness test of the pressure-resistant housing, helium gas is supplied to the inside of the pressure-resistant housing. In the airtightness test, the feedthrough 100 is in contact with the helium gas, so that helium gas with small molecules may get into the insulator 126 (polyethylene and the like) made of resin. This is problematic in that the helium may be permeated from the insulator 126 after the test and the polybutene 140 may leak out resulting from this.

SUMMARY OF THE INVENTION

It is a general object of the present invention to provide an improved and useful feedthrough of a submarine repeater and a submarine repeater in which the above-mentioned problems are eliminated.

A more specific object of the present invention is to provide a feedthrough of a submarine repeater and a submarine repeater that can introduce a tail cable connected to a submarine cable into the inside of the pressure-resistant housing with a simple structure and a high reliability.

According to one aspect of the present invention, there is provided a feedthrough of a submarine repeater for introducing a tail cable connected to a submarine cable having a transmission line and a feed line into said submarine repeater, said feedthrough comprising: a tail cable introduction unit having an insulator for internally installing said transmission line and said feed line, said tail cable introduction unit introducing said tail cable connected to said submarine cable into said submarine repeater; a cap member for fixing said tail cable introduction unit on said submarine repeater; and a rubber film formed so as to cover a surface of said insulator.

In accordance with the above-mentioned invention, the boundary surface between the tail cable introduction unit and the cap member is sealed using the rubber film without using conventional insulating oil. Thus, it is possible to perform highly reliable sealing without causing reduced sealing properties resulting from air bubbles generated upon using the insulating oil or reduced sealing properties resulting from a leak of the insulating oil. Further, the necessity of a complicated structure for filing the insulating oil and a troublesome step for filling is eliminated. Thus, it is possible to reduce the number of components and simplify a manufacturing step.

According to another aspect of the present invention, in the feedthrough of a submarine repeater, preferably, a seal portion is formed on said rubber film so as to define an interface between said insulator and said cap member in a liquid-tight manner.

According to another aspect of the present invention, in the feedthrough of a submarine repeater, preferably, a seal portion is formed on said rubber film while a film thickness thereof is larger in comparison with a film thickness of other portions so as to define an interface between said insulator and said cap member in a liquid-tight manner.

In accordance with each of the above-mentioned structures, it is possible to securely seal the interface between said insulator and said cap member where high reliability is required in particular.

According to another aspect of the present invention, in the feedthrough of a submarine repeater, preferably, the film thickness of said rubber film is set to be equal to or greater than 0.5 mm and equal to or less than 1.0 mm.

According to another aspect of the present invention, in the feedthrough of a submarine repeater, preferably, said rubber film is formed from said tail cable introduction unit to a portion of said tail cable from said cap member, said tail cable being connected to said submarine cable extending to seawater.

In accordance with this structure, it is possible to prevent infiltration of seawater into the rubber film.

According to another aspect of the present invention, in the feedthrough of a submarine repeater, preferably, said cap member is made of metal.

In accordance with this structure, it is possible to securely protect the tail cable introduction unit from water pressure of seawater.

According to another aspect of the present invention, in the feedthrough of a submarine repeater, said insulator of said tail cable introduction unit may include polyethylene.

According to another aspect of the present invention, there is provided a submarine repeater comprising: a pressure-resistant housing including a repeater unit installed therein; a pressure-resistant housing lid disposed on both sides of said repeater unit of said pressure-resistant housing, said pressure-resistant housing lid defining said repeater unit in a liquid-tight manner relative to seawater; and the above-mentioned feedthrough installed on said pressure-resistant housing lid.

According to the present invention, it is possible to perform highly reliable sealing, reduce the number of components, and simplify a manufacturing step.

Other objects, features and advantage of the present invention will become more apparent from the following detailed description when read in conjunction with the accompanying drawings.

DETAILED DESCRIPTION OF THE PREFERRED EMBODIMENTS

Figure 1:
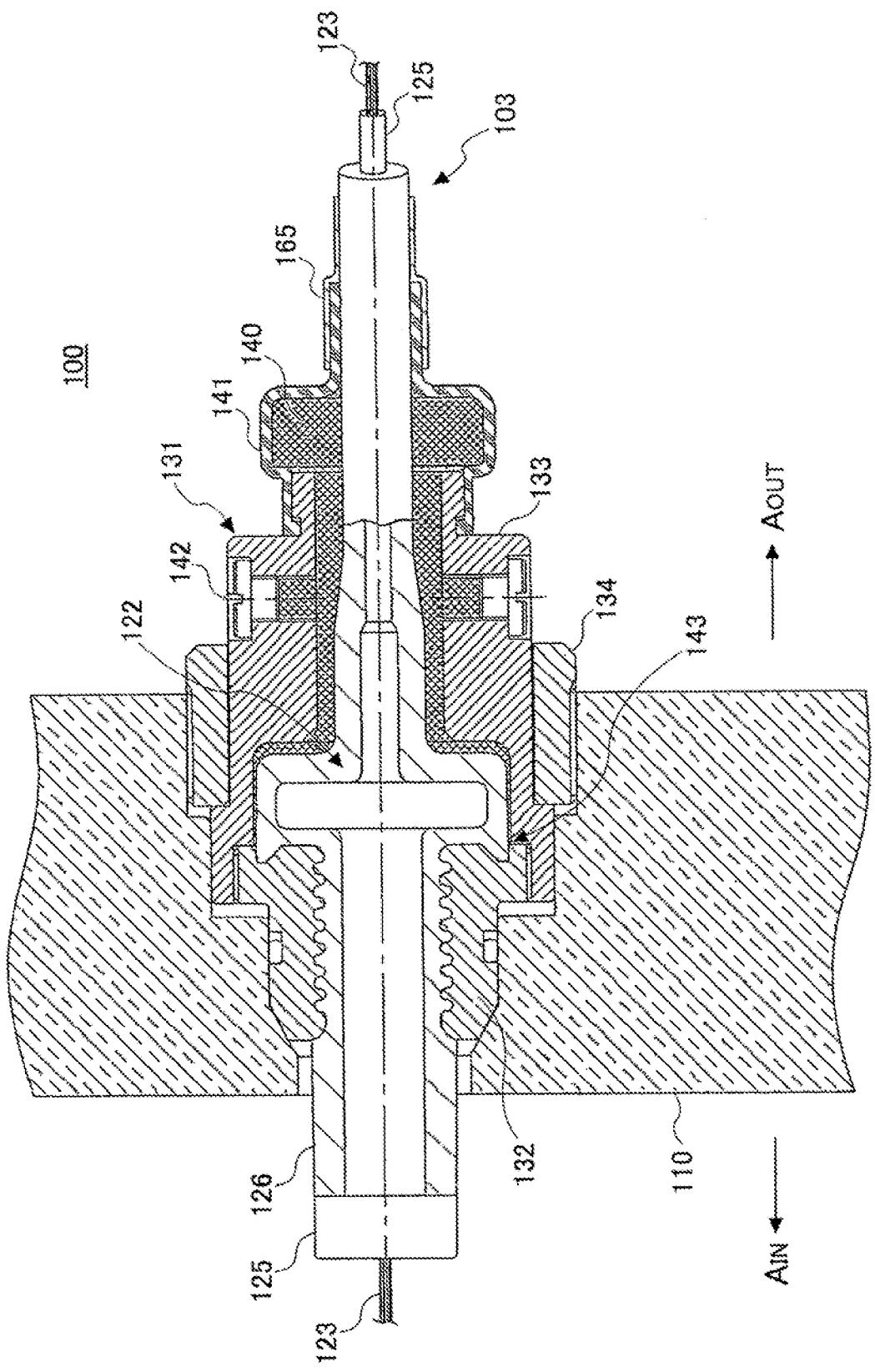
FIG. 1 is a cross-sectional view showing a feedthrough as a conventional example.

The present invention is described in detail based on the embodiments illustrated in the drawings.

Figure 2:
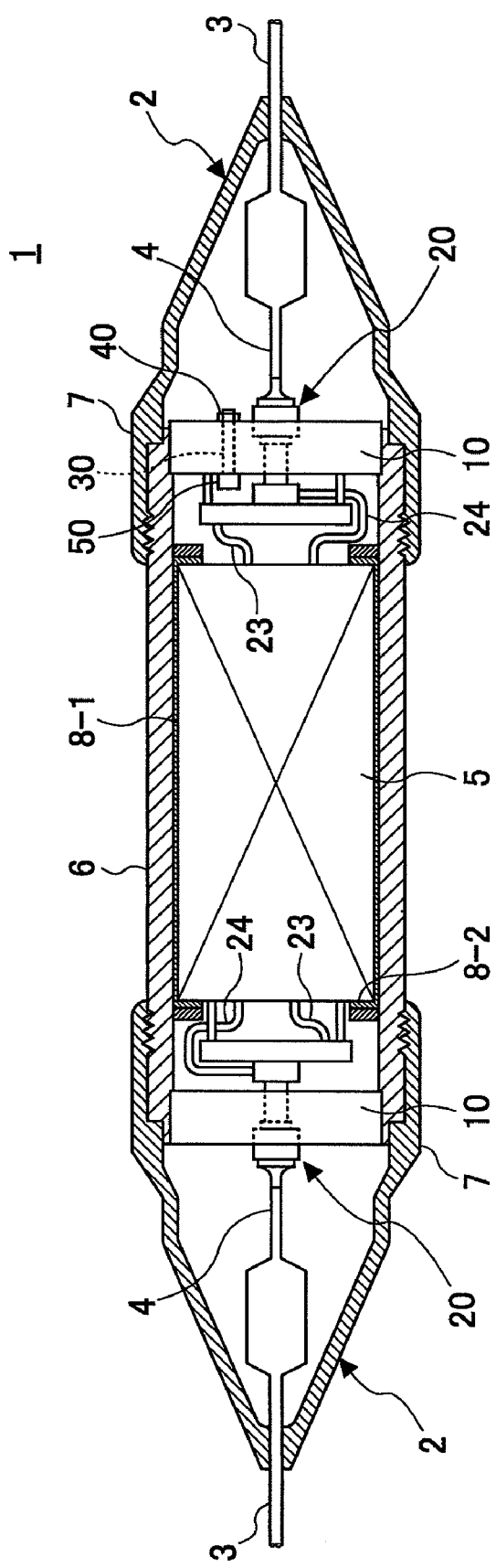
FIG. 2 is a cross-sectional view showing a submarine repeater as an embodiment of the present invention.

FIG. 2 shows a submarine repeater 1 as an embodiment of the present invention. As shown in the figure, the submarine repeater 1 includes a repeater unit 5 stored in a pressure-resistant housing 6. Further, a coupling unit 2 for connecting to a submarine cable 3 is disposed on both sides of the pressure-resistant housing 6.

The repeater unit 5 is fixed inside the pressure-resistant housing 6 via a radiation buffer, the pressure-resistant housing 6 being made of beryllium-copper alloy and the like and having a cylindrical shape. The radiation buffer includes a circumferential radiation buffer 8-1 inserted into the pressure-resistant housing 6 and end-face radiation buffers 8-2 installed inside the pressure-resistant housing 6 so as to hold both end faces of the circumferential radiation buffer 8-1 therebetween.

The circumferential radiation buffer 8-1 is prepared by forming a thin metallic wire into a cylindrical shape with elasticity and coating an outside thereof with a thin metal sheet. The end-face radiation buffer 8-2 is prepared by forming a thin metallic wire into a hollow discoid shape with elasticity and coating an outside thereof with a thin metal sheet. An inside diameter thereof is sufficiently smaller than an inside diameter of the circumferential radiation buffer 8-1. The circumferential radiation buffer 8-1 is inserted into the pressure-resistant housing 6 and the repeater unit 5 is stored further inside.

The coupling unit 2 disposed between the submarine cable 3 and the repeater unit 5 includes a function of anchoring the submarine cable 3 and a function of connecting the submarine cable 3 to a tail cable 4 from the submarine repeater 1. The coupling unit 2 is protected by a coupling housing 7 made of beryllium-copper alloy and the like.

On the other hand, a pressure-resistant housing lid 10 for closing an opening in an airtight manner is disposed at openings on both ends of the pressure-resistant housing 6. A feedthrough 20, which is a main element of the present invention, is disposed on the pressure-resistant housing lid 10. The tail cable 4 connected to the submarine cable 3 is introduced into the inside of the pressure-resistant housing 6 via the feedthrough 20 in an airtight manner, separated into an optical fiber 23 and a feeder line 24, and then connected to the repeater unit 5.

Figure 3:
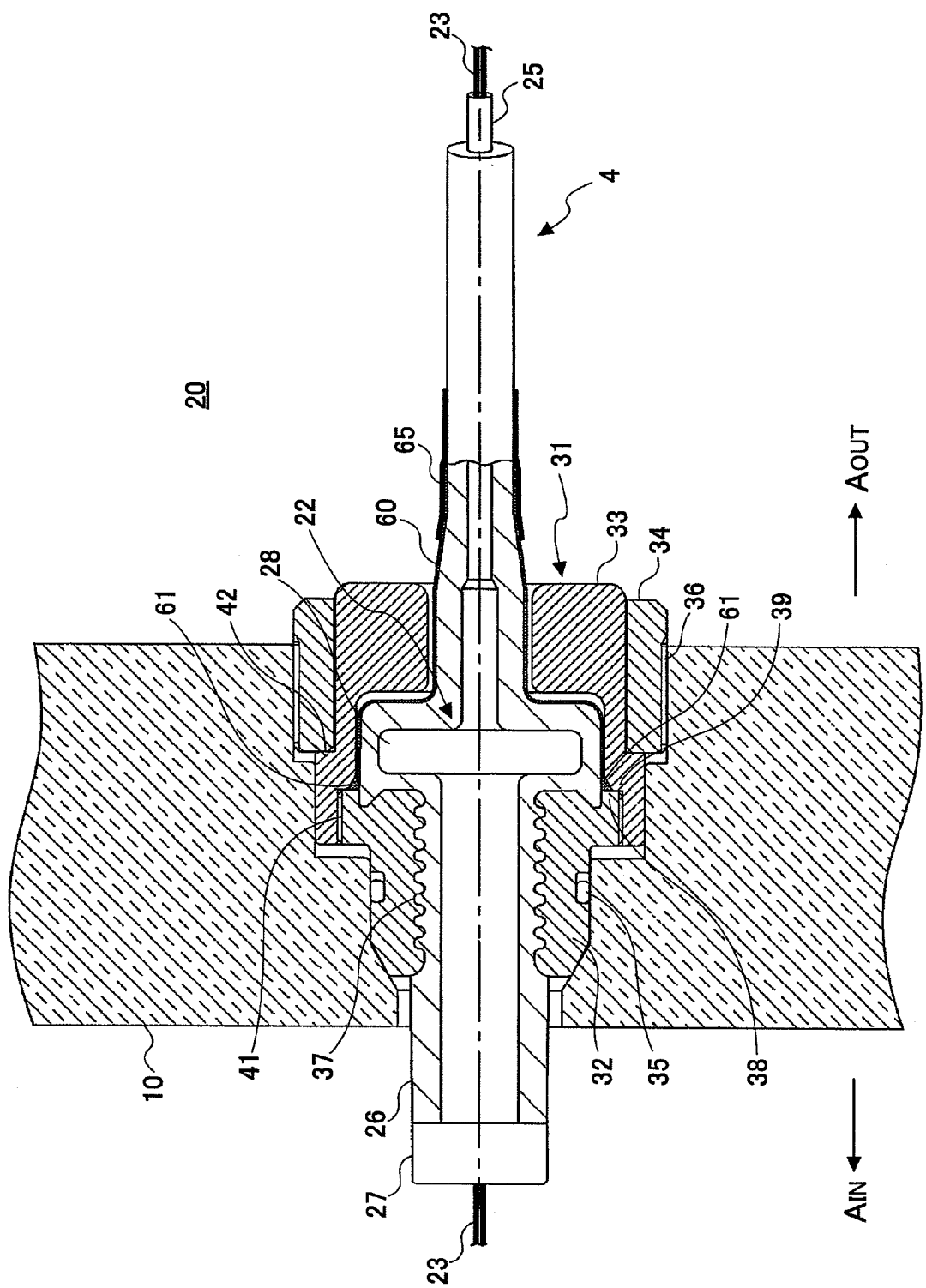
FIG. 3 is a cross-sectional view showing a feedthrough as an embodiment of the present invention.

In the following, a structure of the feedthrough 20 is described with reference to FIG. 3. In addition, as shown in FIG. 3, the feedthrough 20 is disposed on each of the pressure-resistant housing lids 10 disposed on both ends of the pressure-resistant housing 6. However, each feedthrough 20 has the same structure, so that the feedthrough 20 in the right side of the FIG. 2 is shown in FIG. 3 and only the right-side feedthrough 20 is described.

FIG. 3 shows the feedthrough 20 installed on the pressure-resistant housing lid 10 in an enlarged manner. In the figure, to the right of the pressure-resistant housing lid 10 is seawater and to the left is the inside of the pressure-resistant housing 6. Although the seawater side has a high pressure, the inside of the pressure-resistant housing 6 is maintained at the atmospheric pressure.

The tail cable 4 is constructed by successively coating a copper pipe 25 to be used as a feed line and an insulator 26 for insulating the copper pipe 25 onto a circumference of the optical fiber 23 in a laminated manner. The tail cable 4 is integrally connected to a tail cable introduction unit 22 constituting the feedthrough 20.

The tail cable introduction unit 22 includes the optical fiber 23, the copper pipe 25, the insulator 26, a feed line 27, and the like. The insulator 26 is prepared by forming resin (polyethylene, for example) and the optical fiber 23 is disposed on an axial position thereof. The optical fiber 23 is disposed so as to extend to the inside of the pressure-resistant housing 6 from the seawater side, so that the submarine cable 3 and the repeater unit 5 inside the pressure-resistant housing 6 are optically connected.

The copper pipe 25 and the feed line 27 are formed so as to cover the optical fiber 23. The copper pipe 25 and the feed line 27 are soldered, so that the copper pipe 25 and the feed line 27 are electrically connected. In accordance with this, the submarine cable 3 is electrically connected to the repeater unit 5 inside the pressure-resistant housing 6. Further, a flange unit 28 is screwed between the copper pipe 25 and the feed line 27, the flange unit 28 having a diameter larger than diameters of the copper pipe 25 and feed line 27.

A cap member 31 is installed on a circumferential portion of the tail cable introduction unit 22. The cap member 31 is made of metal such as beryllium-copper alloy and the like and includes first and second members 32 and 33. In this manner, by having the metallic cap member 31, it is possible to securely protect the tail cable introduction unit 22 (optical fiber 23, copper pipe 25, insulator 26, and feed line 27) from water pressure of seawater.

The first member 32 is fixed on the insulator 26 positioned at an outermost circumference of the tail cable introduction unit 22 in an inner side of the housing relative to the tail cable introduction unit 22 (left side of the figure). Specifically, a corrugated concavity and convexity portion 37 is formed at an inner circumferential position of the first member 32 and when the concavity and convexity portion 37 is engaged with the insulator 26, the first member 32 is securely fixed on the tail cable introduction unit 22. Further, the second member 33 is fixed on the tail cable introduction unit 22 by being screwed on the first member 32 via a screw portion 41. In accordance with this, the cap member 31 is installed on the tail cable introduction unit 22 in an integrated manner.

On the other hand, on the pressure-resistant housing lid 10, there is formed in advance a concave portion for installation allowing installation of the tail cable introduction unit 22 on which the first member 32 is fixed. After the tail cable introduction unit 22 on which the cap member 31 is fixed is installed on the concave portion for installation, the tail cable introduction unit 22 is fixed on the pressure-resistant housing lid 10 by screwing a nut 34 on a screw portion 36.

Specifically, a third stage portion 42 is formed on the second member 33 and when the nut 34 presses the third stage portion 42 to the pressure-resistant housing lid 10, the tail cable introduction unit 22 on which the cap member 31 is fixed is fixed on the pressure-resistant housing lid 10. Moreover, a seal member 35 is disposed on the first member 32 constituting the cap member 31, so that the cap member 31 (tail cable introduction unit 22) and the pressure-resistant housing lid 10 are defined in a liquid-tight manner using the seal member 35.

When the first member 32 and the second member 33 are screwed, a first stage portion 38 formed on the first member 32 is brought into abutment with a second stage portion 39 formed on the second member 33. In this abutment position, the metallic cap member 31 also confronts the insulator 26 (tail cable introduction unit 22) made of resin and seawater pressure is applied. This position is an extremely important position in which voltage resistance, water pressure resistance, and airtightness are required at the same time. Thus, high reliability is required in particular.

In the present embodiment, a rubber film 60 is disposed on a position facing the insulator 26 of the tail cable introduction unit 22 and the cap member 31. The rubber film 60 is formed so as to cover the insulator 26. Moreover, a film thickness of the rubber film 60 is set within a range from 0.5 mm to 1.0 mm.

The rubber film 60 is disposed from the position where the insulator 26, the first member 32, and the second member 33 are confronted with one another to a halfway position of the extended tail cable 4 (namely, up to a position in seawater) in an elongated manner. In particular, in the position where the insulator 26, the first member 32, and the second member 33 are confronted with one another, a seal portion 61 is formed by setting the film thickness of the rubber film 60 to be larger than the film thickness of other portions.

In accordance with, in the feedthrough 20 according to the present embodiment, a boundary portion between the tail cable introduction unit 22 and the cap member 31 is sealed using the rubber film 60 without using the polybutene 140 (refer to FIG. 1) as in a conventional method. Thus, it is possible to perform highly reliable sealing without causing reduced sealing properties resulting from air bubbles generated upon using the polybutene 140 or reduced sealing properties resulting from a leak of the polybutene 140.

Further, the rubber film 60 is readily installed, so that the conventional necessity of a complicated structure for filing the polybutene 140 and a troublesome step for filling is eliminated. Thus, it is possible to reduce the number of components and simplify a manufacturing step.

Moreover, in the present embodiment, the seal portion 61 is formed on the interface portion where the first member 32 and the second member 33 are brought into abutment with each other and the insulator 26 is confronted. The film thickness of the seal portion 61 is set to be larger than the film thickness of other portions of the rubber film 60, so that a structure equivalent to a structure of an O-ring is provided and high sealing properties are realized. Thus, by forming the seal portion 61 on the rubber film 60, it is possible to securely seal the interface portion where high reliability is required in particular.

Also, it the present embodiment, the rubber film 60 is formed to a portion of the tail cable 4 extending from the cap member 31 to the seawater side, so that it is possible to prevent seawater from infiltrating into the rubber film 60. In this manner, even when the rubber film 60 is configured to be positioned in seawater, seawater has a high pressure, so that the rubber film 60 is brought into close contact with the tail cable 4 from the pressure. Thus, air bubbles and the like are not held inside.

It is possible to apply the present invention as a sealing structure of a device disposed in an environment such as the sea bottom with a high pressure where high sealing properties are required.

The present invention is not limited to the specifically disclosed embodiment, and variations and modifications may be made without departing from the scope of the present invention.

What is claimed is:

1. A feedthrough of a submarine repeater for introducing a tail cable connected to a submarine cable having a transmission line and a feed line into said submarine repeater, said feedthrough comprising:
   a tail cable introduction unit having an insulator for internally installing said transmission line and said feed line, said tail cable introduction unit introducing said tail cable connected to said submarine cable into said submarine repeater;
   a cap member for fixing said tail cable introduction unit on said submarine repeater, said cap member attached to an outer circumferential surface of said insulator; and
   a rubber film disposed between the cap member and the outer circumferential surface of said insulator to cover at least a portion of the outer circumferential surface of said insulator,
   wherein said rubber film extends from said tail cable introduction unit along said tail cable to a portion where said tail cable extending from said cap member is situated in seawater.

2. The feedthrough of a submarine repeater according to claim 1, wherein
   a seal portion is formed on said rubber film so as to define an interface between said insulator and said cap member in a liquid-tight manner.

3. The feedthrough of a submarine repeater according to claim 1, wherein
   a seal portion is formed on said rubber film while a film thickness thereof is larger in comparison with a film thickness of other portions to define an interface between said insulator and said cap member in a liquid-tight manner.

4. The feedthrough of a submarine repeater according to claim 1, wherein
   the film thickness of said rubber film is set to be equal to or greater than 0.5 mm and equal to or less than 1.0 mm.

5. The feedthrough of a submarine repeater according to claim 1, wherein
   said cap member is made of metal.

6. The feedthrough of a submarine repeater according to claim 1, wherein
   said insulator of said tail cable introduction unit includes polyethylene.

7. A submarine repeater comprising:
   a pressure-resistant housing including a repeater unit installed therein;
   a pressure-resistant housing lid disposed on both sides of said repeater unit of said pressure-resistant housing, said pressure-resistant housing lid defining said repeater unit in a liquid-tight manner relative to seawater; and
   the feedthrough according to claim 1 installed on said pressure-resistant housing lid.

* * * * *